United States Patent [19]
Shaw

[11] Patent Number: 5,787,916
[45] Date of Patent: Aug. 4, 1998

[54] PRESSURE TESTING ASSEMBLY FOR PROPANE TANK SYSTEMS AND TESTING METHOD

[76] Inventor: Jimmie Bryant Shaw, Rt. 1, Box 227, Carrollton, Miss. 38917

[21] Appl. No.: 603,215

[22] Filed: Feb. 20, 1996

[51] Int. Cl.⁶ .................. F16L 55/18; F16K 37/00
[52] U.S. Cl. .................. 137/14; 137/15; 137/557; 137/883; 73/40.5; 73/756
[58] Field of Search .................. 137/557, 881, 137/883, 14, 15, 312; 73/756, 40.5

[56] References Cited

U.S. PATENT DOCUMENTS

| | | | |
|---|---|---|---|
| 483,106 | 9/1892 | Dixon | 137/557 |
| 632,808 | 9/1899 | Dunlap | 137/557 |
| 1,666,283 | 4/1928 | Farley | 137/557 |
| 2,881,011 | 4/1959 | Coughlin | 137/557 |
| 2,923,312 | 2/1960 | Wagner | 137/320 |
| 3,517,693 | 6/1970 | Dietz | 137/557 |
| 3,853,144 | 12/1974 | Whelan | 137/883 |
| 3,891,002 | 6/1975 | Mowrer et al. | 137/557 |
| 4,332,273 | 6/1982 | Boyce | 137/322 |
| 4,338,793 | 7/1982 | O'Hern, Jr. | 62/292 |
| 4,450,721 | 5/1984 | Gaunt et al. | 73/708 |
| 4,702,754 | 10/1987 | Blocker | 137/227 |
| 4,944,292 | 7/1990 | Gaelce et al. | 137/883 |
| 4,976,134 | 12/1990 | Potvia | 137/14 |
| 5,183,078 | 2/1993 | Sorrell | 137/883 |
| 5,404,905 | 4/1995 | Lauria | 137/557 |

*Primary Examiner*—A. Michael Chambers
*Attorney, Agent, or Firm*—Larson & Taylor

[57] ABSTRACT

A method and assembly (kit) are provided for use by propane tank service personnel to detect escaping gas in propane tank systems. The standard connector between the regulator and tank service valve is replaced with a permanent valve assembly including a valve unit disposed in a branch connection of a tee connector. A separate pressure gauge is individually assigned to tank service personnel and adapted to be carried by such personnel in testing the pressure in the propane tank. The pressure gauge includes a hose having, at the distal end thereof, a valve unit connector for actuating the valve unit when the gauge is connected to the valve unit. When the pressure gauge is connected to the valve unit the latter is actuated to provide an immediate reading of the tank pressure. A determination is made from this reading whether the tank is out of gas, and if out of gas, the service valve is turned on, gas introduced, the service valve turned off and a further pressure check made to determine whether gas is leaking.

6 Claims, 2 Drawing Sheets

PRESSURE TESTING ASSEMBLY FOR PROPANE TANK SYSTEMS AND TESTING METHOD

FIELD OF THE INVENTION

The present invention relates to propane tank systems and, more particularly, to a testing assembly and testing method for enabling repair personnel such as a driver-serviceman to readily check for leakage of propane gas from such a system.

BACKGROUND OF THE INVENTION

Propane gas leaks can obviously cause serious problems. For example, fires resulting from such leaks can cause both property damage and personal injury including, in extreme cases, death. Thus, a very real need exists for an approach in testing for such leaks that will effectively protect the homeowner-user of propane gas. Such protection would also be of substantial benefit to the companies that serve such homeowner-users particularly in the area of reducing the spiraling costs of lawsuits involving situations where leakage of gas into the home of a customer from the propane system. This leakage is often from appliances that have inadvertently been left on at the time of a gas outage in the propane tank. In any event, whatever the cause of such leakage, it is obviously very important to be able to readily determine when there is leakage from the system.

There are strict rules associated with the assembly and servicing of propane systems. The current rules are set out in NFPA Pamphlet 58. Considering the rules bear on the issues involved with the present invention, NFPA Pamphlet 58, Section 3-2.10 states that "After assembly, piping systems (including hose) shall be tested and proven free of leaks at not less than operating pressure." Section 4.2.1 states that "Before gas is introduced into a system after being shut off, the entire system shall be inspected to determine that there are no open fittings or ends and all manual valves at outlets on equipment are closed and all unused valves at outlets are closed and plugged or capped." Section 4.2.2 states "Immediately after turning on the gas the piping system shall be tested to ascertain that no gas is escaping." In addition, section 4.3.4 describes the process for purging (emptying of air) a system that has been opened and states "After the piping has been placed in operation, all equipment shall be purged and then placed in operation as necessary."

Section 4.1.4 of this pamphlet describes the methods of pressure testing and states as follows: "(a) Test pressure shall be measured with a manometer or with a pressure measuring device designed and calibrated to read, record, or indicate a pressure loss due to leakage during the pressure test period. The source of pressure shall be isolated before the pressure tests are made. (b) The test pressure to be used shall be no less than 1½ times the proposed maximum working pressure, but not less than 3 psig, irrespective of design pressure. Where the pressure exceeds 125 psig, the test pressure shall not exceed a value that produces a hoop stress in the piping greater than 50 percent of the specified minimum yield strength of the pipe. (c) Systems for undiluted liquified petroleum gases shall withstand the pressure test in accordance with (b) above, or, for single-staged systems operating at a pressure of ½ psig or less, shall withstand a test pressure of 9.0+½ inch water column for a period of not less than 10 minutes without showing any drop in pressure. If the source of pressure for this test is a liquified petroleum gas container, the container service valve shall be checked for positive shutoff with leak detector solution prior to the test, or shall be disconnected from the system during the test. (d) Test duration shall be not less than ½ hour for each 500 cubic feet of pipe volume or fraction thereof. When testing a system having a volume less than 10 cubic feet or a system in a single-family dwelling, the test duration shall be permitted to be reduced to 10 minutes. For a piping system having a volume of more than 24,000 cubic feet, the duration of the test shall not be required to exceed 24 hours." Finally, Section 4.1.2 (exception) states that "Fuel gas shall be permitted to be used in piping systems operating at pressures of 0.5 psig."

At present, there is no way for a driver-salesman or a service person, hereinafter referred to for convenience as a repairman or repair personnel, to check for leakage as described above without interrupting the gas piping, a process that is very time consuming. Further, this process introduces unwanted air into the system and thus requires such air to be purged.

There are, of course, many systems which use permanent valves and gauges for determining and/or controlling the pressure in the system. Reference is made in this regard to U.S. Pat. Nos. 2,923,312 (Wagner), 4,332,273 (Boyce) and 4,338,793 (O'Hern, Jr.) relating to refrigeration systems and to U.S. Pat. No. 4,702,754 (Blocker) relating to natural gas or propane delivery systems and U.S. Pat. No. 4,183,078 (Sorrell) relating to a combination shut-off and test-injection valve. Briefly considering some of these patents, the Wagner patent discloses a valve tool for charging and discharging refrigeration systems including a tee-adapter for testing gas pressures. The Boyce patent discloses a leak-proof connector including a valve of the Schrader (or Schroeder) type while the O'Hern, Jr. patent discloses an adapter for a refrigeration system which also uses a normally closed Schrader valve. The Blocker patent discloses a test adapter which permits pressure tests to be carried out on delivery systems for fuel gas, i.e., propane or natural gas.

SUMMARY OF THE INVENTION

According to the present invention, an assembly and method are provided which permit service or repair personnel to check a propane system for leaks at the time of introduction of propane into the system and which eliminates the need for the purging described above after the test. The service person can also ascertain whether the system is actually out of gas, requiring interruption of service, in spite of the reading(s) provided by the tank gauge(s) since such gauges may be inoperative or may be giving false readings.

In accordance with a first aspect of the invention, a method is provided for use by propane tank service personnel in detecting escaping gas in propane tank systems including a regulator and a tank service valve connected together by a standard connector, the method comprising the steps of: replacing the standard connector with a permanent valve assembly comprising a flexible connector including end first and second connections, a tee connection including a main body connected in line in said flexible connector and a branch connector portion, a valve unit disposed in said branch connection and including a valve stem actuable to open said valve unit, and a cap for closing off said branch connector, the replacing step including connecting said first and second end connections to the tank service valve and the regulator, respectively; and using a separate pressure gauge assembly individually assigned to tank service personnel and adapted to be carried by said personnel in testing the pressure in the propane tank, said pressure gauge assembly including a pressure gauge having a hose connected at one end to the pressure gauge and including, at the other end thereof, a valve assembly connector including means for actuating the valve unit when the valve assembly connector is connected to the valve assembly, the testing of pressure comprising connecting the valve assembly connector of the pressure gauge assembly to the branch connector portion of the tee connection of the valve assembly to actuate the valve unit and thus provide an immediate reading of the tank pressure by said gauge, determining from the reading of tank pressure whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system. It will be appreciated that because each tank service person carries his or her own gauge assembly, a separate gauge is not necessary for each propane tank system and one gauge assembly only is needed by each service person.

In a preferred, advantageous embodiment, the gauge includes an indicating needle and further comprises a pressure scale and an ambient temperature scale calibrated relative to said pressure scale so that the position of the needle that provides a reading of gauge pressure on the pressure scale also provides a reading of the corresponding minimum ambient temperature on the ambient temperature scale, and the determining step for determining whether the tank is out of propane gas includes determining the actual ambient temperature and comparing the actual ambient temperature with the reading of said corresponding minimum ambient temperature.

According to a second aspect of the invention, a kit is provided for use in a propane tank system for enabling detection of escaping gas by tank repair personnel, the tank system including a standard connector connecting a regulator to a tank service valve, and the kit comprising: a valve assembly for connection between the regulator and the service valve in place of the standard connector, the valve assembly comprising a flexible connector including end connections for connection to the regulator and the service valve, respectively, a tee connector including a main body connected in line in the flexible connector between the regulator and the tank service valve and a branch connector portion connected at one end thereof centrally of the main body so as to extend perpendicular thereto and terminating in a free end, a valve unit disposed in the branch connector and including a valve stem actuable to open a connection from the flexible connector to the free end of the branch connector portion, and a cap for closing off the free end of the branch connector portion; and a separate pressure gauge assembly adapted to be carried by tank repair personnel and including a pressure gauge, a mounting element for the pressure gauge and a hose connected at one end thereof to said pressure gauge through said mounting element and including means, disposed at the other end thereof for connection to said free end of the branch connector portion of the valve assembly, for, when connected to said free end, providing actuation of the valve stem so that, in use with the tank service valve open, the gauge provides a reading of the tank pressure and, in use with the system pressurized and the tank service valve closed, the gauge indicates the presence of a leak or open line in the propane tank system.

The gauge preferably includes an indicating needle and further comprises includes a pressure scale and an ambient temperature scale calibrated relative to said pressure scale so that the position of the needle that provides a reading of gauge pressure on the pressure scale also provides a reading of the corresponding minimum ambient temperature on the ambient temperature scale.

The valve unit advantageously comprises a Schrader valve. Further, the means disposed at the other end of the hose of the gauge assembly preferably includes a finger pressure operated screw-on connector. The latter feature enables the gauge assembly to be connected to the system without the use of wrenches or the like.

Other features and advantages of the invention will be set forth in, or apparent from, the following detailed description of the preferred embodiment of the invention.

DESCRIPTION OF THE PREFERRED EMBODIMENTS

Figure 1:
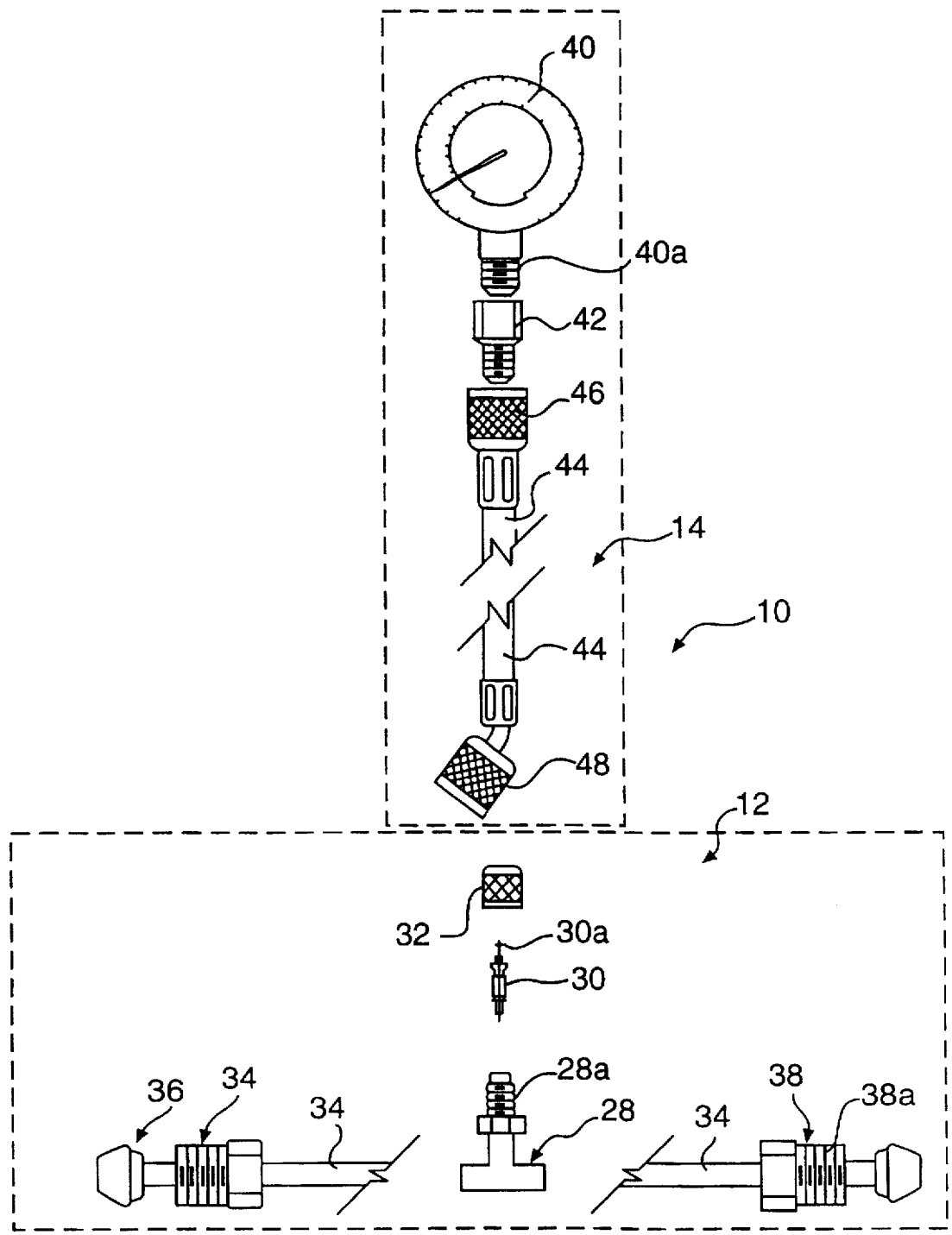
FIG. 1 is an exploded front elevational view of a pressure testing kit or assembly constructed in accordance with a preferred embodiment of the invention.

Referring to FIG. 1, there is shown an exploded front elevational view of the propane tank leakage detection kit or assembly of the invention. The overall assembly, which is generally denoted 10, basically comprises a valve assembly 12 which is adapted to be installed on the tank and a pressure gauge assembly 14 is carried by repair or service personnel and, as explained in more detail below, is adapted to be connected in line in the tank system and used in cooperation with valve assembly 12 to provide an indication or measurement of the gas pressure within the tank.

Figure 2:
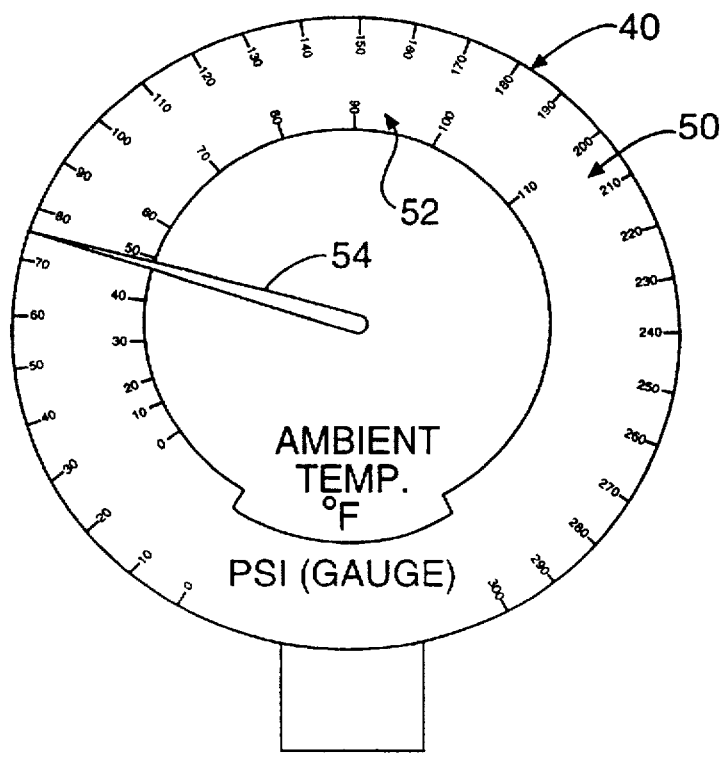
FIG. 2 is a top plan view of a propane tank incorporating the testing assembly of FIG. 1.

Before considering the two assemblies 12 and 14 in more detail, reference is made to FIG. 2 which shows the assembly 10 about to be used to measure the pressure with a propane tank 16 of a propane tank system generally denoted 18. The propane tank system 18 includes a tank valve 20 located on the top of tank 16 generally centrally thereof, a flexible "pigtail" connector 22 which connects tank valve 20 to a regulator 24 and an outlet connector 26 which connects regulator 24 to the house piping, i.e., the piping into the house at which the tank system 18 is used.

It will be understood that tank valve 20, regulator 24 and connector 26 are conventional, and that a conventional system would include a connection, typically in the form of a pigtail connector, between the tank valve and regulator. However, in accordance with the present invention, the conventional connection between valve 20 and regulator 22 is completely replaced by a connector 22 which is constituted by or incorporates a valve assembly 12 corresponding to that shown in FIG. 1 and which cooperates with a pressure gauge assembly 14 which is shown in FIG. 2 and which also corresponds to that shown in FIG. 1.

Referring again to FIG. 1, valve assembly 12 includes a tee connector 28 which includes a central branch forming a male flare connection 28a adapted to receive therein a valve unit or valve 30. Valve 30 is preferably a conventional Schrader valve such as the valves which are conventionally used in refrigeration systems. Such a valve is described in, for example, in U.S. Pat. No. 4,338,793 to O'Hern, Jr.

referred to above. The valve 30 includes a valve stem or operator 30a which controls opening and closing of the valve 30 in a contentional manner. A knurled valve cap 32 fits over the male connection 28a when the valve is not connected to gauge assembly 14. The base of tee connector 28 is fitted in line into a flexible connector 34 so that, with valve 30 closed, a direct or through connection is provided thereby between tank valve 20 and regulator 24. At opposite ends of flexible connector 34 are conventional end connections 36 and 38 including male unions 36a and 38a. It is to be understood that apart from connection therein of a valve unit therein the flexible connection 34 and end connections 36 and 38 are entirely conventional and themselves form no part of the invention. The elements are considered to be part of valve assembly 12 because, in accordance with the invention, the entire existing standard or conventional connection between tank valve 20 and regulator 24 is replaced by valve assembly 22 rather than inserting a valve unit in the existing connection. Further, the end connections 36 and 38 (and particularly the latter) can take different forms depending on the nature of the existing connection in the propane system.

Turning now to the gauge assembly 14, this assembly includes a gauge 40 with a main connector 40a, an intermediate connector element 42, and a hose 44 with a first female flare union 46 at the end thereof proximate to gauge 40 and a second female flare union 48 at the opposite end thereof. Union 48 includes an actuator pin or member (not specifically shown) which provides actuation of valve stem 30a and thus opening of valve unit 30 when union 48 is screwed onto the male flare connection 28a of tee connector 28.

Figure 3:
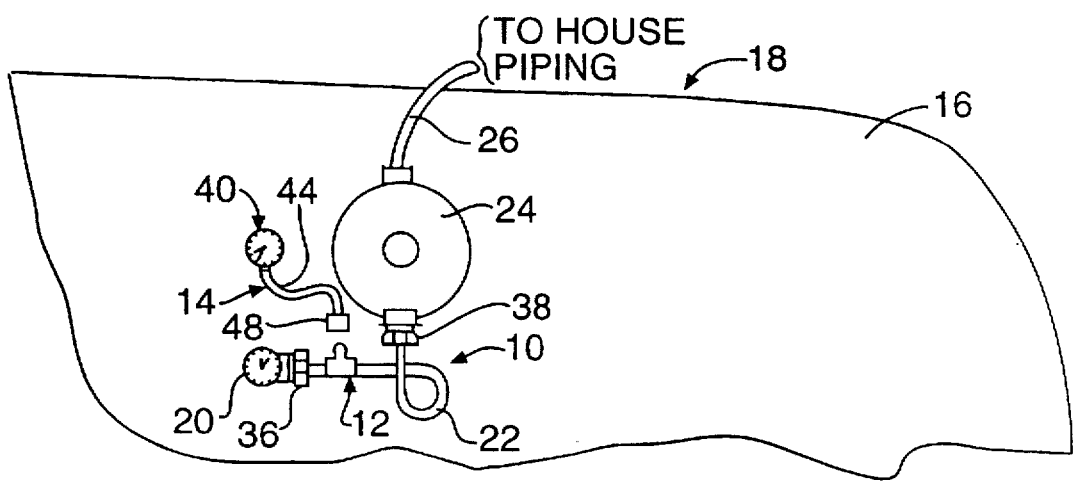
FIG. 3 is a front elevational view of the gauge of FIG. 1.

The face of gauge 40 is shown in more detail in FIG. 3. Gauge 40 is a pressure gauge and in the illustrated embodiment, a measurement band or scale 50 provided around the outer periphery of the gauge indicates the measured gauge pressure in pounds per square inch, while an inner, concentric, part-circular measurement band or scale 52 provides an indication of the corresponding ambient temperature in degrees F. In the latter regard, the temperature scale 52 is calibrated to provide an indication of the minimum ambient temperature for the corresponding pressure reading so that, as shown, for a measurement of 40 psi gauge the temperature should be no higher than about 20° F. while for measurement of 50 psi gauge the temperature should not be higher than roughly about 52° F. These pressure-temperature relationships have been previously determined for propane tanks and by incorporating the relationships into gauge 40, a repairman, knowing the ambient temperature, is provided with a direct indication as to whether the tank 16 may be out of fluid. Thus, considering the position of the needle 54 of gauge 40 shown in FIG. 3, the ambient temperature corresponding to the pressure reading (of about 75 psi) is about 48° F. so that the actual ambient temperature is higher, the tank 18 is possibly out of liquid.

It is to be understood that the indication provided by gauge 40 essentially concerns the rate of vaporization of the liquid so that when the ambient temperature reading corresponding to the gauge pressure is lower than the actual ambient temperature, an indication is provided that the vaporization rate in the tank 16 is insufficient. It will be appreciated that there can be more than one cause for this so that the tank may not actually be empty. For example, the situation may be one wherein the liquid in the tank is being used at a very high rate when the pressure measurement is made or one where the tank is too small and a larger tank is thus required. In any event, the pressure measurement and the corresponding calibrated value of the ambient temperature as compared with the actual temperature alert the repairman to a possible problem, including the possibility that the tank is empty.

Considering the overall operation of the assembly 10 of FIGS. 1 to 3, to install the valve assembly 12, the repairman simply replaces the existing, typically flexible connection between tank valve 20 and regulator 24 with valve assembly 12. With the valve assembly in place, to make a pressure measurement, cap 32 is removed from tee section 28 and the end connector or hose 44 is screwed onto tee section 28 so as to actuate valve 30 and open a path to gauge 40. A reading is then taken to determine whether the tank is out of liquid. As discussed above, even if a pressure reading is obtained, the repairman will be alerted to the possibility that the tank is out of liquid if the corresponding calibrated ambient temperature reading on scale 52 is less than the actual ambient temperature. Assuming that some filling of the tank 16 is required, the tank is pressurized and the tank valve 20 is closed. At this point, gauge 40 is checked again to determine whether there is a leak. If gauge 40 provides a steady reading, there is no leak downstream thereof. On the other hand, if there is a significant fall in pressure and, in particular a fall in pressure within the limits of sections 54 and 58 of the NFPA Pamphlet referred to above, it can be safely assumed that there is a leak in the system or an open appliance valve. The gas supply valve should then be left off, the customer notified and repairs made, as required.

Although the present invention has been described to specific exemplary embodiments thereof, it will be understood by those skilled in the art that variations and modifications can be effected in these exemplary embodiments without departing from the scope and spirit of the invention.

What is claimed is:

1. A method for use by propane tank service personnel in detecting escaping gas in propane tank systems including a regulator and a tank service valve connected together by a standard connector, said method comprising the steps of:

replacing the standard connector with a permanent valve assembly comprising a flexible connector including end first and second connections, a tee connection including a main body connected in line in said flexible connector and a branch connector portion, a valve unit disposed in said branch connection and including a valve stem actuable to open said valve unit, and a cap for closing off said branch connector, said replacing step including connecting said first and second end connections to the tank service valve and the regulator, respectively; and using a separate pressure gauge assembly individually assigned to tank service personnel and adapted to be carried by said personnel in testing the pressure in the propane tank, said pressure gauge assembly including a pressure gauge having a hose connected at one end to said pressure gauge and including, at the other end thereof, a valve assembly connector including means for actuating the valve unit when said valve assembly connector is connected to said valve assembly, said testing of pressure comprising connecting the valve assembly connector of said pressure gauge assembly to said branch connector portion of the tee connection of said valve assembly to actuate said valve unit and thus provide an immediate reading of the tank pressure by said gauge, determining from said reading whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the tank service valve on, introducing gas into the system to pressurize the system, thereafter turning the tank service valve back off again so as to isolate the gas introduced into the tank, and reading the gauge pressure to determine whether gas is escaping from the propane tank system.

2. A method as claimed in claim 1 wherein said gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale, and wherein said determining step for determining whether the tank is out of propane gas includes determining the actual ambient temperature and comparing the actual ambient temperature with said reading of said corresponding minimum ambient temperature.

3. A kit for use in a propane tank system for enabling detection of escaping gas by tank repair personnel, the tank system including a standard connector connecting a regulator to a tank service valve, and said kit comprising:

a valve assembly for connection between the regulator and the service valve in place of the standard connector, said valve assembly comprising a flexible connector including end connections for connection to the regulator and the service valve, respectively, a tee connector including a main body connected in line in said flexible connector between the regulator and the service valve and a branch connector portion connected at one end thereof centrally of said main body so as to extend perpendicular thereto and terminating in a free end, a valve unit disposed in said branch connector and including a valve stem actuable to open a connection from said flexible connector to the free end of said branch connector portion, and a cap for closing off the free end of said branch connector portion; and a separate pressure gauge assembly adapted to be carried by tank repair personnel and including a pressure gauge, a mounting element for said pressure gauge and a hose connected at one end thereof to said pressure gauge through said mounting element and including means, disposed at the other end thereof for connection to said free end of the branch connector portion of said valve assembly, for, when connected to said free end, providing actuation of said valve stem so that, in use with the tank service valve open, the gauge provides a reading of the tank pressure and, in use with the system pressurized and the tank service valve closed, the gauge indicates the presence of a leak or open line in the propane tank system.

4. A kit as claimed in claim 3 wherein said gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

5. A kit as claimed in claim 3 wherein said valve unit comprises a Schrader valve.

6. A kit as claimed in claim 3 wherein said means disposed at the other end of said hose includes a finger pressure operated screw-on connector.

* * * * *